(12) United States Patent
Finch et al.

(10) Patent No.: US 7,537,239 B2
(45) Date of Patent: May 26, 2009

(54) SEAMLESS AIRBAG RING WITH INTEGRATED DUCT MOUNT

(75) Inventors: Paul Finch, Northville, MI (US); Gary Mullen, Farmington, MI (US); Steven Sic, Livonia, MI (US); William Bauer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 11/552,742

(22) Filed: Oct. 25, 2006

(65) Prior Publication Data

US 2008/0100038 A1 May 1, 2008

(51) Int. Cl.
*B60R 21/16* (2006.01)
(52) U.S. Cl. ............................ 280/732; 454/127; 296/70
(58) Field of Classification Search ................. 280/732, 280/728.3, 728.2, 752; 454/127, 69; 180/90; 296/70, 208
See application file for complete search history.

(56) References Cited

U.S. PATENT DOCUMENTS

| | | | |
|---|---|---|---|
| 5,085,465 A | 2/1992 | Hieahim | |
| 5,333,901 A * | 8/1994 | Barnes | 280/732 |
| 5,564,515 A | 10/1996 | Schambre | |
| 6,264,233 B1 | 7/2001 | DeWitt | |
| 6,354,623 B1 | 3/2002 | Delmastro | |
| 6,398,256 B1 * | 6/2002 | Saito | 280/732 |
| 6,857,681 B2 * | 2/2005 | Nakajima | 296/70 |
| 7,234,726 B2 * | 6/2007 | Trevino et al. | 280/728.3 |
| 2003/0047915 A1 * | 3/2003 | Sun et al. | 280/728.2 |
| 2003/0080540 A1 * | 5/2003 | Kinane | 280/728.2 |
| 2004/0214517 A1 | 10/2004 | Dietze | |
| 2004/0232668 A1 * | 11/2004 | DePue et al. | 280/732 |
| 2005/0046155 A1 | 3/2005 | Tomford et al. | |
| 2005/0121890 A1 | 6/2005 | Kong | |
| 2006/0131844 A1 * | 6/2006 | Trevino et al. | 280/728.3 |

FOREIGN PATENT DOCUMENTS

| | | |
|---|---|---|
| JP | 05238345 | 9/1993 |
| JP | 09164861 | 6/1997 |

* cited by examiner

*Primary Examiner*—Ruth Ilan
*Assistant Examiner*—Drew J. Brown
(74) *Attorney, Agent, or Firm*—Gregory Brown; Brooks Kushman P.C.

(57) ABSTRACT

An airbag ring for mounting an airbag assembly to an instrument panel including an airbag ring portion having a first aperture. The first aperture being dimensioned to allow an airbag to pass through the first aperture during airbag deployment and a duct mounting portion integral with the airbag ring portion, the duct mounting portion having a second aperture.

18 Claims, 4 Drawing Sheets

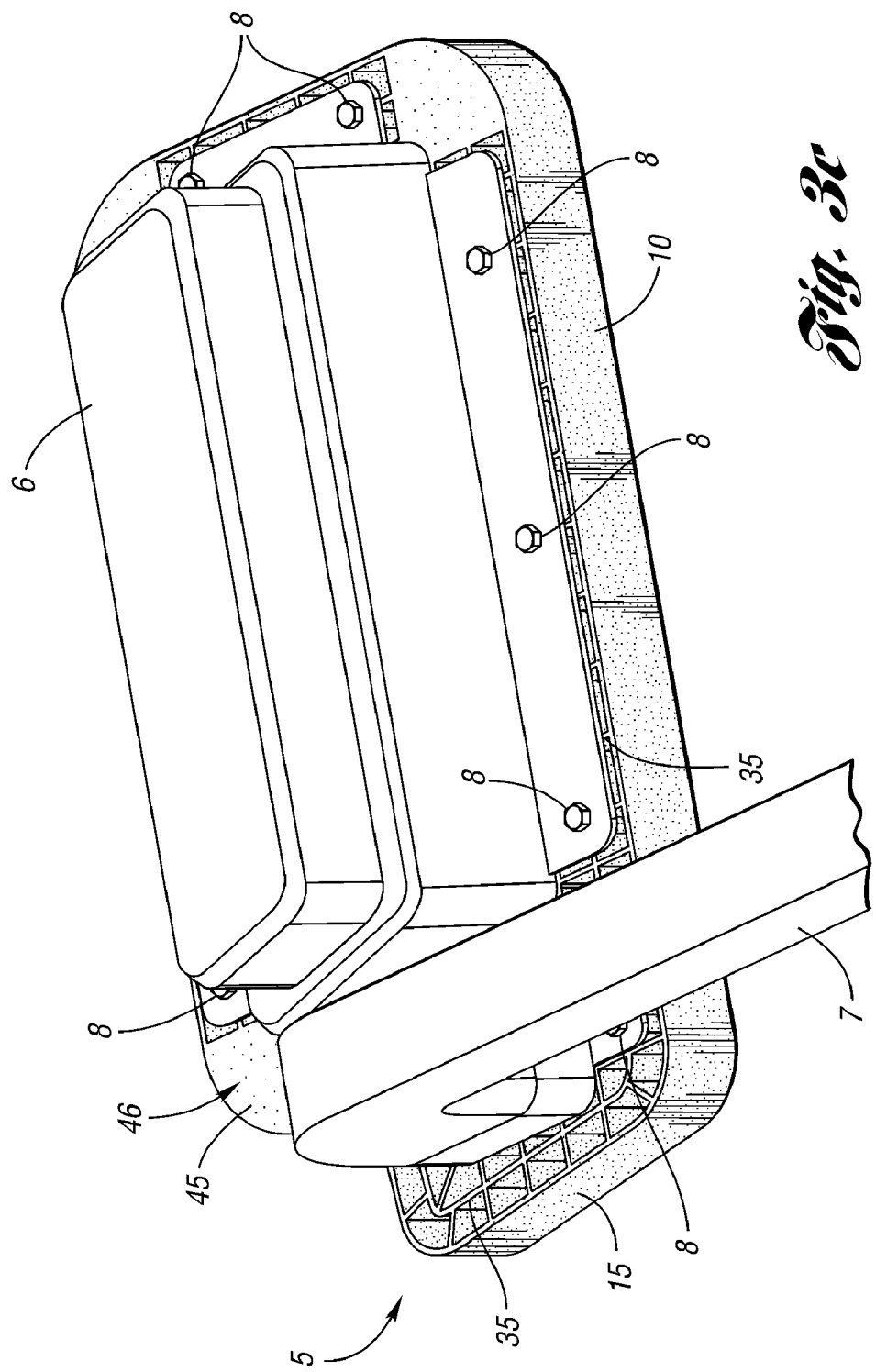

SEAMLESS AIRBAG RING WITH INTEGRATED DUCT MOUNT

BACKGROUND OF THE INVENTION

1. Field of the Invention

This invention relates to seamless airbag rings.

2. Background Art

A front passenger airbag in an automobile is typically mounted to the instrument panel and is located approximately in front of the front passenger seat. In older applications, there would typically be a door or other covering to conceal the airbag from view. In such applications, the door created a visible seam in the instrument panel.

For purposes of aesthetics, instrument panels have been developed to conceal the presence of a front passenger airbag by eliminating the visible seam in the instrument panel. One method of achieving a seamless instrument panel includes forming an opening in the substrate of the instrument panel and scoring the underside of the instrument panel cover to form a frangible seam which, when viewed from the passenger compartment of the vehicle, is not visible.

In one embodiment of such a system, the airbag assembly is mounted to the underside of the instrument panel's substrate through the use of an airbag ring, which may be plastic and which may be attached to the instrument panel's substrate by a vibration welding process. Once the airbag ring is mounted to the instrument panel, the airbag assembly is mounted to the airbag ring. In this manner, the airbag ring serves both as a direct interface between the airbag assembly and the instrument panel, and also serves to provide added strength and stability to the instrument panel's substrate.

Heating, ventilation, and air conditioning systems typically require that a second aperture be formed in the substrate of the instrument panel to allow the heating, ventilation, and air conditioning ducts to vent into the passenger compartment. The presence of a second opening in the instrument panel's substrate can weaken the instrument panel's substrate and may require more space than is desirable or available.

The applicant's invention addresses this problem by integrating the heating, ventilation, and air conditioning duct mount with the airbag ring to form a unitary structure requiring only one opening in the instrument panel. This solution both strengthens the instrument panel and conserves space.

SUMMARY OF THE INVENTION

In accordance with at least one aspect of the present invention, an airbag ring for mounting an airbag assembly to an instrument panel having an integral portion to allow the mounting of a ventilation duct is provided. In a first embodiment, the airbag ring has a ring portion having a first aperture. The first aperture is dimensioned to allow an airbag to pass through it during airbag deployment. The airbag ring further includes a duct mounting portion integral with the airbag ring portion. The duct mounting portion has a second aperture to facilitate the air flow through the duct mounting portion.

In one implementation of the first embodiment, the air bag ring has a first side having a surface and a second side having a surface. The first side is adapted to allow attachment of the first side to an instrument panel. The second side is adapted to allow attachment of the air bag ring portion to an air bag assembly. In a further implementation of the first embodiment, the adaptation of the first side to allow attachment of the first side to an instrument panel includes a raised structure. In a further implementation of the first embodiment, the raised structure is disposed on the surface of the first side. In a variation of this implementation, there is a plurality of the raised structures disposed on the surface of the first side. In a further variation of this implementation, the non-contiguous raised structures are a plurality of raised ribs disposed on the surface of the first side in the proximity of the first and second aperture.

In another implementation of the first embodiment, the air bag ring further includes a first side having a surface and a second side having a surface, the first side being adapted to allow attachment of the first side to an instrument panel and the second side being adapted to allow attachment of the air bag ring portion to an air bag assembly. In this implementation, the adaptation of the second side to allow attachment of the air bag ring portion to an air bag assembly includes a hole in the second side. In a variation of this implementation, the adaptation of the second side to allow attachment of the air bag ring portion to an air bag assembly includes a plurality of holes. In further variations, the holes are disposed around the first aperture.

In another implementation of the first embodiment, the air bag ring further includes a first side having a surface and a second side having a surface and wherein the second aperture is shaped to direct air flow in a desired direction. In another implementation of this first embodiment, the surface of the first side has a depression that is contiguous with the second aperture to form a diffuser to direct air flow in a desired direction. In another implementation of the first embodiment, the second side is adapted to allow attachment of the duct mounting portion to the ventilation duct. In other implementations of this first embodiment, the adaptation of the second side to allow attachment of the duct mounting portion to the ventilation duct includes a hole in the second side. In a variation of this implementation, the adaptation of the second side to allow attachment of the duct mounting portion to the ventilation duct includes a plurality of holes disposed around the second aperture.

In another implementation of the first embodiment, at least one of the air bag ring portion or the duct mounting portion is made of a material including plastic. Additionally, at least one of the air bag ring portion or the duct mounting portion has ribs.

In a second embodiment, an air bag ring for mounting an air bag assembly to an instrument panel for a vehicle includes an air bag ring portion having a first aperture that is dimensioned to allow an air bag to pass through the first aperture during air bag deployment. This embodiment further includes a duct mounting portion that is integral with the air bag ring portion. The duct mounting portion has a second aperture to the facilitate air flow through the duct mounting portion. The air bag ring further includes a first side having a surface that is adapted to allow the attachment of the first side to an instrument panel. The air bag ring also has a second side having a surface that is adapted to allow attachment of the air bag ring portion to an air bag assembly. The second side is further adapted to allow attachment of the duct mounting portion to a ventilation duct.

In another implementation of the second embodiment, at least one of the air bag ring portion or the duct mounting portion is made from a material including plastic. Additionally, at least one of the air bag ring portion or the duct mounting portion has structural ribs. In another implementation of the second embodiment, the adaptation of the first side to allow attachment of the first side to an instrument panel includes a raised structure disposed on the surface of the first side. The adaptation of the second side to allow attachment of the air bag ring portion to an air bag assembly includes a hole in the second side in the proximity of the first aperture and the adaptation of the second side to allow attachment of the duct mounting portion to a ventilation duct includes a hole in the second side in proximity to the second aperture. In a variation of this implementation, the adaptation of the first side to allow attachment of the first side to an instrument panel includes a plurality of raised ribs disposed on the surface of the first side. The adaptation of the second side to allow attachment of the air bag ring portion to an air bag assembly includes a plurality of holes in the second side in the proximity of the first aperture. Further, the adaptation of the second side to allow attachment of the duct mounting portion to a ventilation duct includes a plurality of the holes in the second side in the proximity of the second aperture.

In a third embodiment of this invention, an air bag ring for mounting a passenger side air bag assembly to the passenger side of an instrument panel of an automotive vehicle includes an air bag ring portion having a first aperture that is generally rectangular in shape. The first aperture is dimensioned to allow an air bag to pass through the first aperture during air bag deployment. The air bag ring also includes a duct mounting portion integral with the air bag ring portion. The duct mounting portion has a second aperture shaped to direct air to flow through the second aperture in a desired direction. The air bag further includes a first side having a surface having a depression that is contiguous with the second aperture to form a diffuser to direct air flow in a desired direction. The first side further has a plurality of raised ribs to allow attachment of the first side to an instrument panel. The air bag ring further has a second side having a surface that has a plurality of holes around the first aperture to allow attachment of the air bag ring portion to an air bag assembly. The second side further has a plurality of holes around the second aperture to allow attachment of the duct mounting portion to a ventilation duct. Further, at least one of the air bag ring portion or the duct mounting portion is made from a plastic material. Additionally, at least one of the air bag ring portion or the duct mounting portion has structural ribs.

BRIEF DESCRIPTION OF THE DRAWINGS

FIG. 3B is a perspective view of the underside of the embodiment shown in FIG. 3a;

FIG. 3C is a perspective view of the underside of the embodiment shown in FIG. 3a with an airbag assembly and a heating, ventilation, and air conditioning duct attached;

DETAILED DESCRIPTION OF THE PREFERRED EMBODIMENT(S)

Reference will now be made in detail to the presently preferred embodiments of the present invention which constitute the best modes of practicing the invention presently known to the inventors. The following descriptions are merely exemplary in nature and are in no way intended to limit the invention, its application, or uses. The figures are not necessarily drawn to scale. Therefore, specific details disclosed herein are not to be interpreted as limiting, but merely as a representative basis for any aspect of the invention and/or as a representative basis for teaching one skilled in the art to variously employ the present invention.

Figure 1:
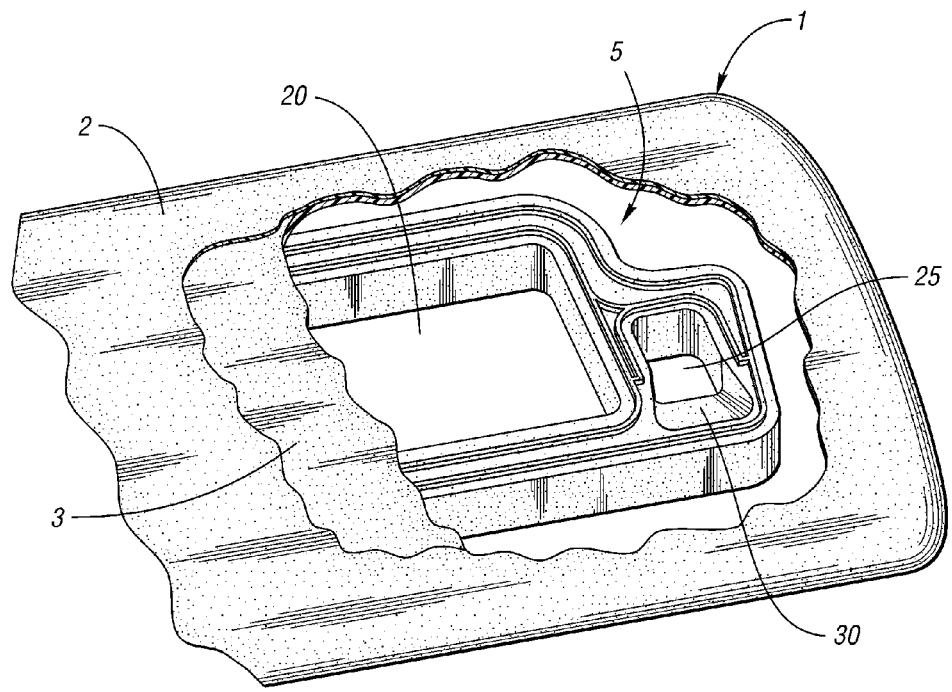
FIG. 1 is a cutaway perspective view of an instrument panel incorporating an embodiment of a seamless airbag ring having an integrated duct mounting portion.
Figure 2:
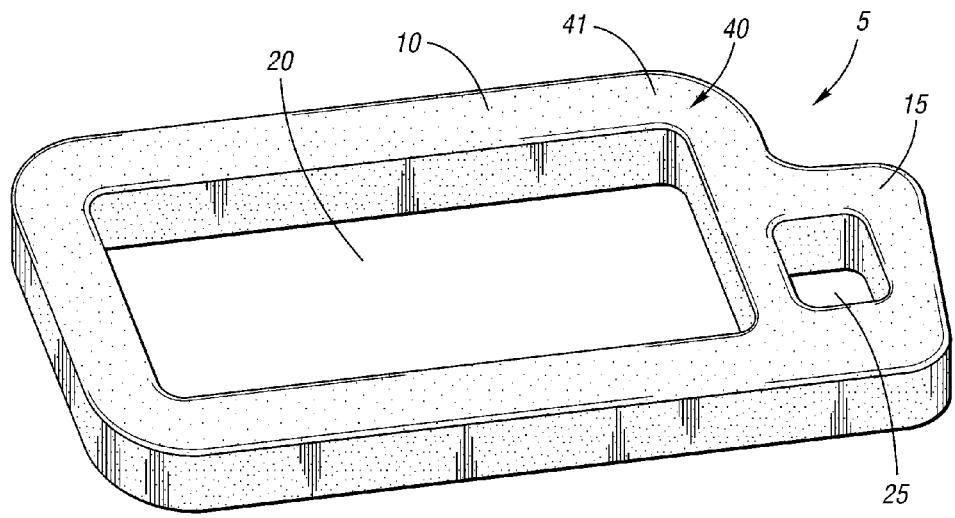
FIG. 2 is a perspective view of an embodiment of the seamless airbag ring.

As shown in FIGS. 1-5, the present invention includes an airbag ring 5 having an airbag ring portion 10 having a first aperture 20 through which an airbag can deploy during a collision and a duct mounting portion 15 having a second aperture 25 for directing air from an automobile's heating, ventilation, and air conditioning system into the vehicle's passenger compartment. The integration of an airbag ring with a heating, ventilation, and air conditioning duct mount in a single structure allows for compact and efficient spacing of the airbag ring and the ventilation duct mount. Preferably, but not necessarily, the airbag ring is made of a material comprising plastic. Preferably, but not necessarily, the airbag ring is made using a plastic injection molding process. Though the embodiment shown in FIG. 2 depicts the first and second apertures 20, 25 as being generally rectangular in shape, they may take any shape and orientation needed to accommodate airbag assembly 6 and heating, ventilation, and cooling duct 7.

The airbag ring 5 may be attached to substrate 3 of an instrument panel 1 (see FIG. 1) by vibration welding. Alternatively, the airbag ring 5 may be attached to the instrument panel's substrate 3 through sonic welding, epoxy and/or through the use of any other methods or fasteners effective to facilitate attachment. Vibration welding entails placing the airbag ring 5 against the instrument panel's substrate 3 and vibrating the two members so that they melt together to form a solid construction.

To facilitate vibration welding, preferably, the airbag ring 5 and the substrate 3 are made of the same material. In at least one embodiment, a plurality of raised ribs 50 (see FIG. 3a and FIG. 4) are disposed on a surface 41 of a first side 40 of the airbag ring 5. During the vibration welding process, the plurality of raised ribs 50 melt together with the substrate 3 to form a solid bond between the instrument panel's substrate 3 and the airbag ring 5. In other embodiments, a plurality of raised, non-contiguous structures can be utilized. In such embodiments, the raised structures can be aligned with one another in an arrangement resembling the raised ribs 50 or they can be disposed in any other pattern effective to facilitate attachment of the airbag ring to the instrument panel.

Figure 3A:
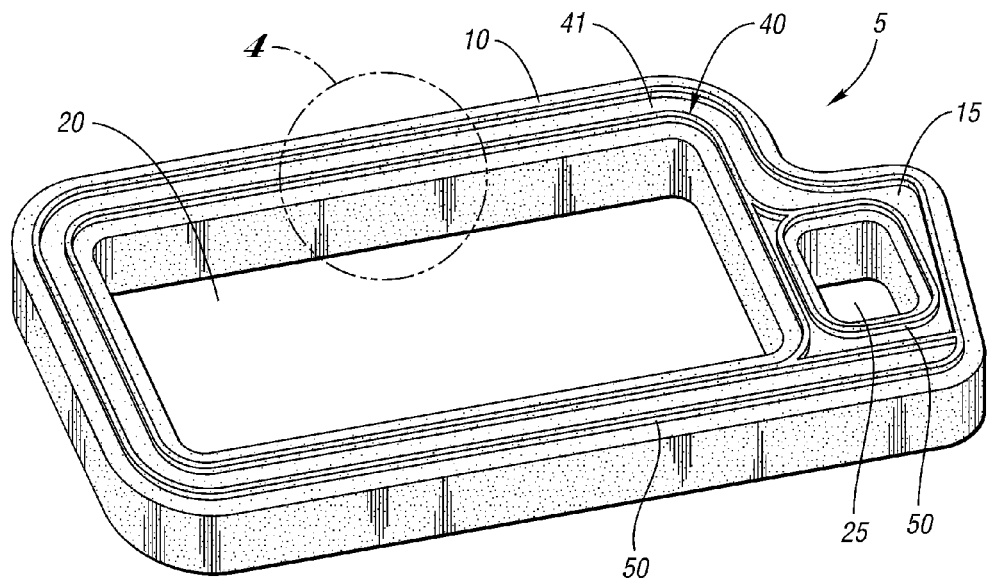
FIG. 3A is a perspective view of an embodiment of the seamless airbag ring.
Figure 4:
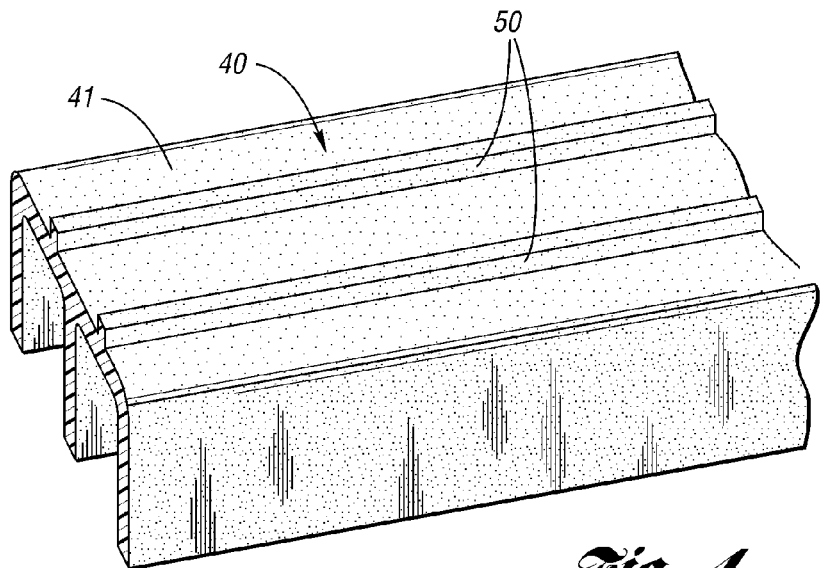
FIG. 4 is a fragmentary perspective view of the portion of the embodiment circled in FIG. 3A.
Figure 5:
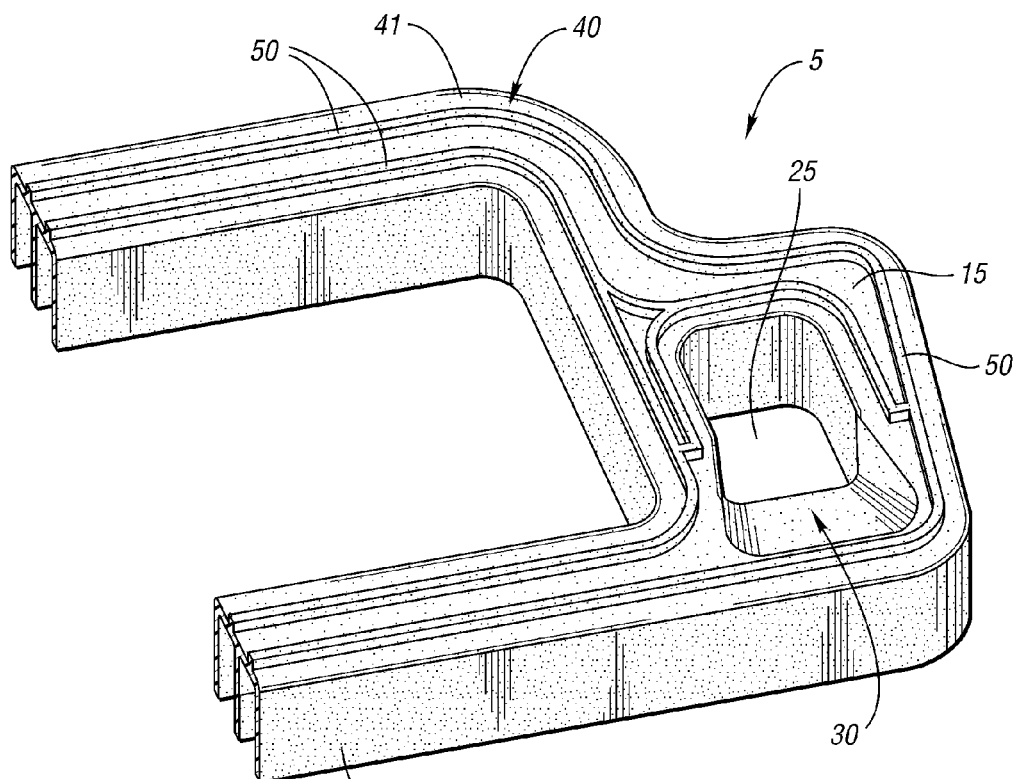
FIG. 5 is a fragmentary perspective view of at least another embodiment of the seamless airbag ring.

FIG. 4 is a fragmentary view of the portion of the airbag ring 5 shown in circle 4 of FIG. 3a. In this view, the raised nature of the plurality of raised ribs 50 is illustrated.

Figure 3B:
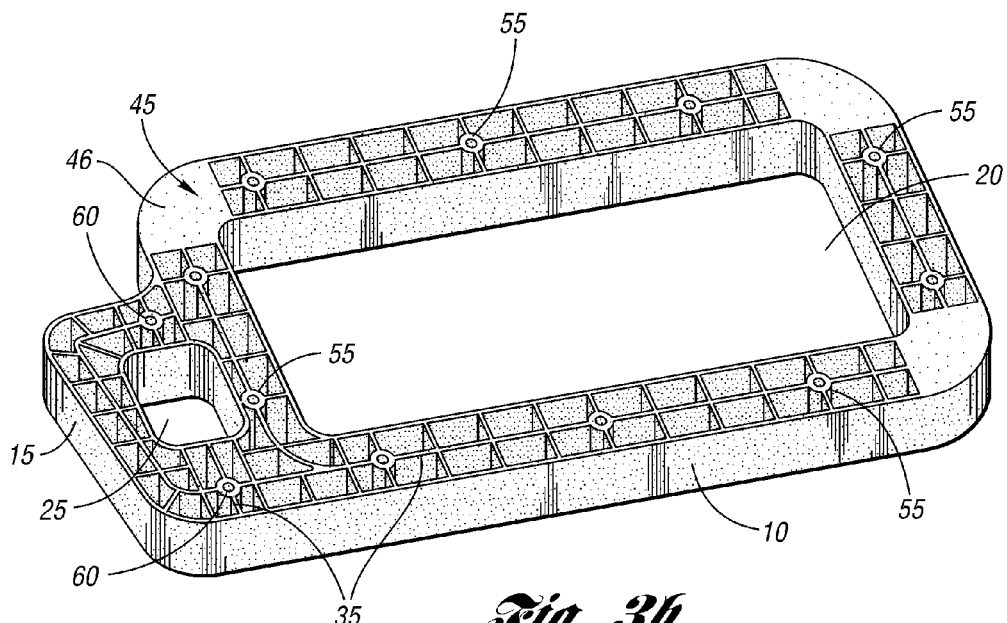

In at least one embodiment, the airbag ring 5 comprises structural ribs 35 (see FIG. 3b). The structural ribs 35 impart structural support and strength while reducing the weight and the amount of material needed to make the airbag ring 5. An airbag assembly 6 may be connected to the second side 45 of airbag ring 5 in any conventional manner. In at least one embodiment, the second side 45 of airbag ring 5 comprises a plurality of holes 55 disposed around the first aperture 20 to permit the fastening of the airbag assembly 6 to the second side 45 of airbag ring 5, such as through the use of screws. FIG. 3c depicts the airbag assembly 6 attached to a second side 45 of airbag ring 5. In the embodiment depicted in FIG. 3c, screws 8 are used to secure the airbag assembly 6 to the airbag ring 5.

A heating, ventilation and air conditioning duct 7 may be connected to the second side 45 of airbag ring 5 in substantially the same manner as the airbag assembly 6. A plurality of holes 60 may be disposed on the second side 45 of airbag ring 5 around the second aperture 25 for securing the heating, ventilation and air conditioning duct 7 through the use of screws 8. In other embodiments, any fasteners effective to facilitate attachment may be used to secure the heating, ventilation and air conditioning duct 7 to the second side 45 of airbag ring 5.

In another embodiment of the airbag ring 5, the second aperture 25 can be shaped to control the direction of air flow as it passes through the duct mounting portion 15 of airbag ring 5. In at least one embodiment, a depression 30 (see FIG. 5) in the surface 41 of the first side 40 of airbag ring 5 can be positioned in proximity to the second aperture 25 to form a diffuser.

FIG. 1 depicts instrument panel 1 which comprises an instrument panel cover 2 and an instrument panel substrate 3. An embodiment of airbag ring 5 is shown positioned behind the passenger side of instrument panel 1, attached to substrate 3. Airbag ring 5 can be used anywhere in a vehicle where it is desirable to position a heating, ventilation and air conditioning duct 7 in close proximity to an airbag assembly 6 in a vehicle.

While the best mode for carrying out the invention has been described in detail, those familiar with the art to which this invention relates will recognize various alternative designs and embodiments for practicing the invention as defined by the following claims.

What is claimed:

1. An airbag ring for mounting an airbag assembly to an instrument panel comprising:
    an airbag ring portion having a first aperture dimensioned to allow an airbag to pass through the first aperture during airbag deployment;
    a duct mounting portion integral with the airbag ring portion, the duct mounting portion having a second aperture for facilitating air flow therethrough;
    a first side having a surface; and
    a second side having a surface;
    wherein the first side is adapted to allow attachment of the first side to an instrument panel, the second side is adapted to allow attachment of the airbag ring portion to an airbag assembly and the surface of the first side comprises a depression that is contiguous with the second aperture to form a diffuser to direct airflow in a desired direction.

2. The airbag ring of claim 1 wherein the adaptation of the first side to allow attachment of the first side to an instrument panel comprises a raised structure.

3. The airbag ring of claim 2 wherein the raised structure is disposed on the surface of the first side.

4. The airbag ring of claim 3 having a plurality of the raised structures disposed on the surface of the first side.

5. The airbag ring of claim 4 wherein the non-contiguous raised structures are a plurality of raised ribs disposed on the surface of the first side proximate the first and second aperture.

6. The airbag ring of claim 1 wherein the adaptation of the second side to allow attachment of the airbag ring portion to an airbag assembly comprises a hole in the second side.

7. The airbag ring of claim 6 wherein the adaptation of the second side to allow attachment of the airbag ring portion to an airbag assembly includes a plurality of holes.

8. The airbag ring of claim 7 wherein the holes are disposed around the first aperture.

9. The airbag ring of claim 1 wherein the second aperture is shaped to direct airflow in a desired direction.

10. The airbag ring of claim 9 wherein the second side is adapted to allow attachment of the duct mounting portion to a ventilation duct.

11. The airbag ring of claim 10 wherein the adaptation of the second side to allow attachment of the duct mounting portion to the ventilation duct comprises a hole in the second side.

12. The airbag ring of claim 11 wherein the adaptation of the second side to allow attachment of the duct mounting portion to the ventilation duct comprises a plurality of the holes disposed around the second aperture.

13. The airbag ring of claim 1 wherein at least one of the airbag ring portion and the duct mounting portion comprises a plastic material and wherein at least one of the airbag ring portion and the duct mounting portion has ribs.

14. An airbag ring for mounting an airbag assembly to an instrument panel of a vehicle comprising:
    an airbag ring portion having a first aperture dimensioned to allow an airbag to pass through the first aperture during airbag deployment;
    a duct mounting portion integral with the airbag ring portion, the duct mounting portion having a second aperture to facilitate air flow;
    a first side having a surface that is adapted to allow attachment of the first side to an instrument panel, the surface of the first side comprising a depression that is contiguous with the second aperture to form a diffuser to direct airflow in a desired direction;
    a second side having a surface that is adapted to allow attachment of the airbag ring portion to an airbag assembly and that is further adapted to allow attachment of the duct mounting portion to a ventilation duct.

15. The airbag ring of claim 14 wherein at least one of the airbag ring portion and the duct mounting portion comprises a plastic material and wherein at least one of the airbag ring portion and the duct mounting portion has structural ribs.

16. The airbag ring of claim 14 wherein the adaptation of the first side to allow attachment of the first side to an instrument panel comprises a raised structure disposed on the surface of the first side, the adaptation of the second side to allow attachment of the airbag ring portion to an airbag assembly comprises a hole in the second side proximate the first aperture, and the adaptation of the second side to allow attachment of the duct mounting portion to a ventilation duct comprises a hole in the second side proximate the second aperture.

17. The airbag ring of claim 16 wherein the adaptation of the first side to allow attachment of the first side to an instrument panel comprises a plurality of the raised ribs disposed on the surface of the first side, the adaptation of the second side to allow attachment of the airbag ring portion to an airbag assembly comprises a plurality of the holes in the second side proximate the first aperture, and the adaptation of the second side to allow attachment of the duct mounting portion to a ventilation duct comprises a plurality of the holes in the second side proximate the second aperture.

18. An airbag ring for mounting a passenger side airbag assembly to the passenger side of an instrument panel of an automotive vehicle comprising:
    an airbag ring portion having a first aperture that is generally rectangular in shape, the first aperture being dimensioned to allow an airbag to pass through the first aperture during airbag deployment;

a duct mounting portion integral with the airbag ring portion, the duct mounting portion having a second aperture shaped to direct air to flow through the second aperture in a desired direction;

a first side having a surface having a depression contiguous with the second aperture to form a diffuser to direct air flow in a desired direction and further having a plurality of raised ribs to allow attachment of the first side to an instrument panel;

a second side having a surface having a plurality of holes around the first aperture to allow attachment of the airbag ring portion to an airbag assembly and further having a plurality of holes around the second aperture to allow attachment of the duct mounting portion to a ventilation duct, wherein at least one of the airbag ring portion or the duct mounting portion comprises a plastic material and wherein at least one of the airbag ring portion or the duct mounting portion has structural ribs.

* * * * *